United States Patent
Uppal et al.

[11] Patent Number: 5,873,243
[45] Date of Patent: Feb. 23, 1999

[54] TORQUE GENERATOR STEERING DEVICE

[75] Inventors: Sohan L. Uppal, Bloomington, Minn.; Leslie J. Kasper, Solon, Ohio

[73] Assignee: Eaton Corporation, Cleveland, Ohio

[21] Appl. No.: 997,441

[22] Filed: Dec. 23, 1997

Related U.S. Application Data

[63] Continuation-in-part of Ser. No. 728,229, Oct. 10, 1996, Pat. No. 5,799,694, and a continuation-in-part of Ser. No. 862,887, May 23, 1997.

[51] Int. Cl.$^6$ ........................................ F15B 9/14
[52] U.S. Cl. ............................................ 60/384; 418/61.3
[58] Field of Search ............................ 60/384; 418/61.3

[56] References Cited

U.S. PATENT DOCUMENTS

| | | | |
|---|---|---|---|
| Re. 25,291 | 12/1962 | Charlson . | |
| 3,131,602 | 5/1964 | Ford .......................................... | 91/137 |
| 4,169,515 | 10/1979 | Presley ..................................... | 180/149 |
| 4,381,905 | 5/1983 | Peterson .................................. | 418/61 B |
| 4,936,094 | 6/1990 | Novacek .................................. | 60/384 |

*Primary Examiner*—Gerald A. Michalsky
*Attorney, Agent, or Firm*—L. J. Kasper

[57] ABSTRACT

A torque generator steering device (11) including a gerotor gear set (17) disposed adjacent an end cap (15) and having the input shaft (21) extending through the end cap and through the orbiting and rotating star member (31). The valving of the device, including a spool valve (37) and a sleeve valve (39), is disposed on the side of the gerotor gear set (17) toward an output shaft (23). Preferably, the input shaft (21) is integral with the spool valve (37), and the sleeve valve (39) is integral with the output shaft (23). A coupling arrangement (77) is provided to translate orbital and rotational movement of the star (31) into rotational follow-up movement of the sleeve valve (39). The result is a very short, compact torque generator having substantially reduced backlash between the input shaft (21) and the output shaft (23).

7 Claims, 4 Drawing Sheets

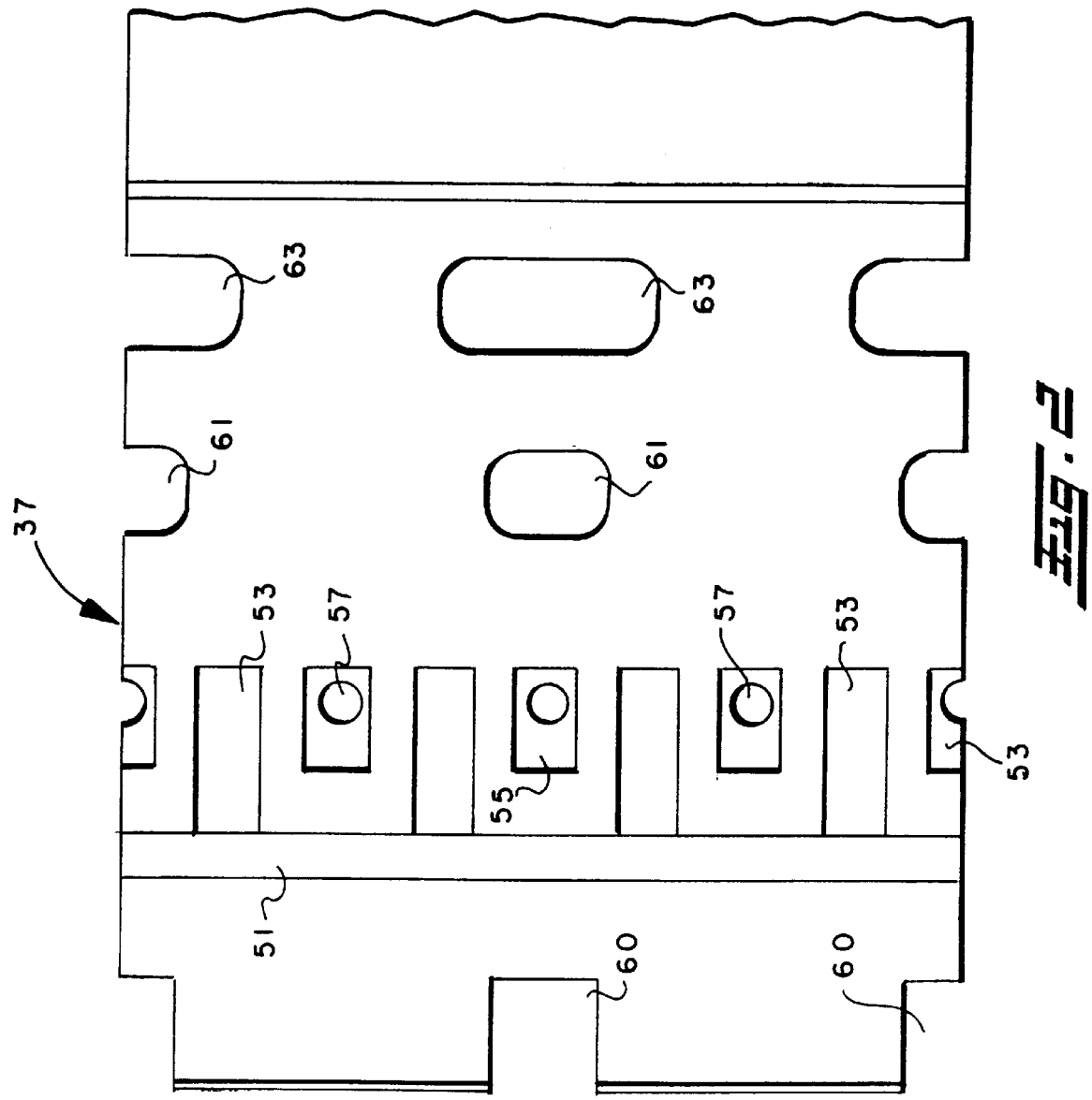

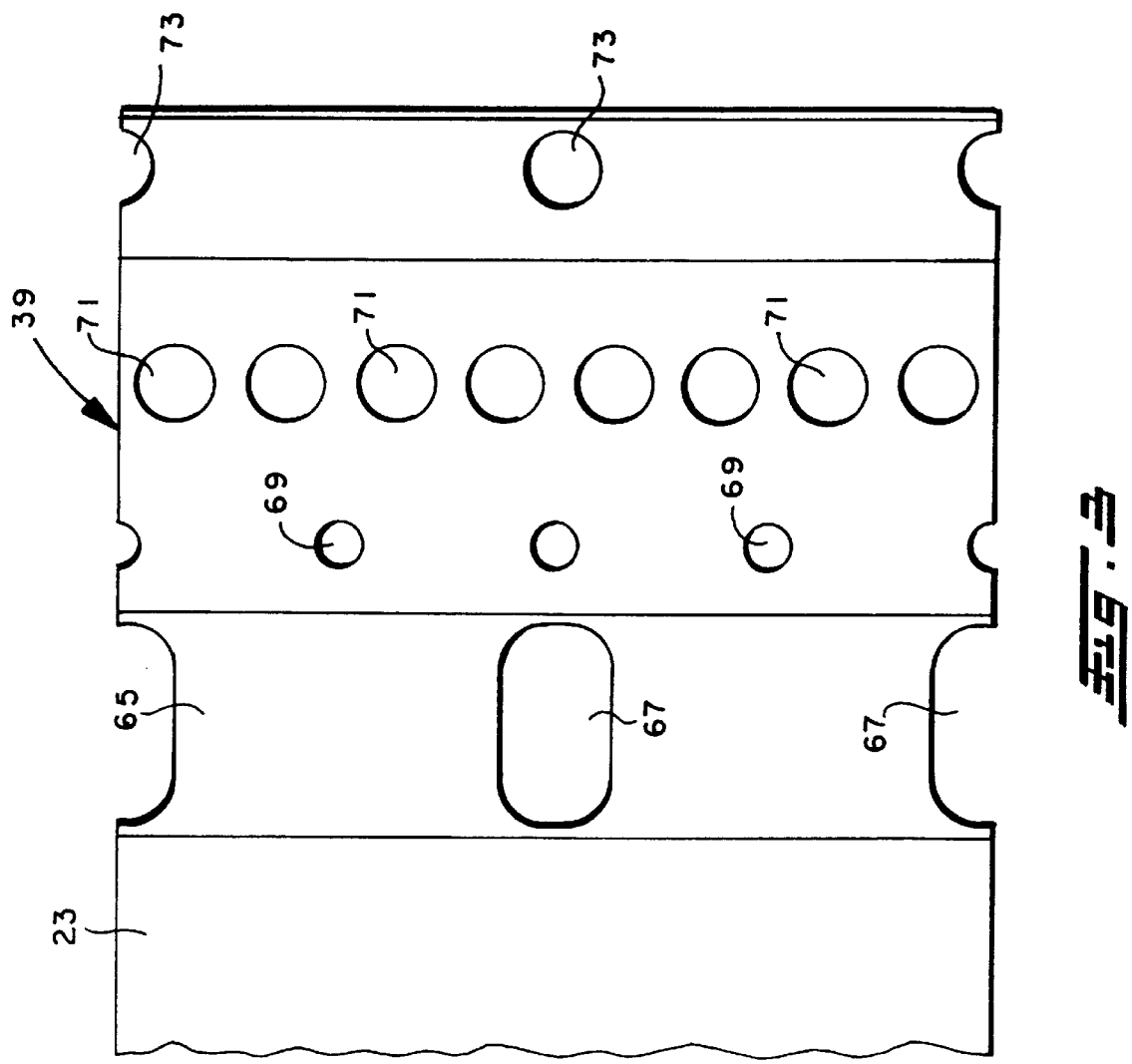

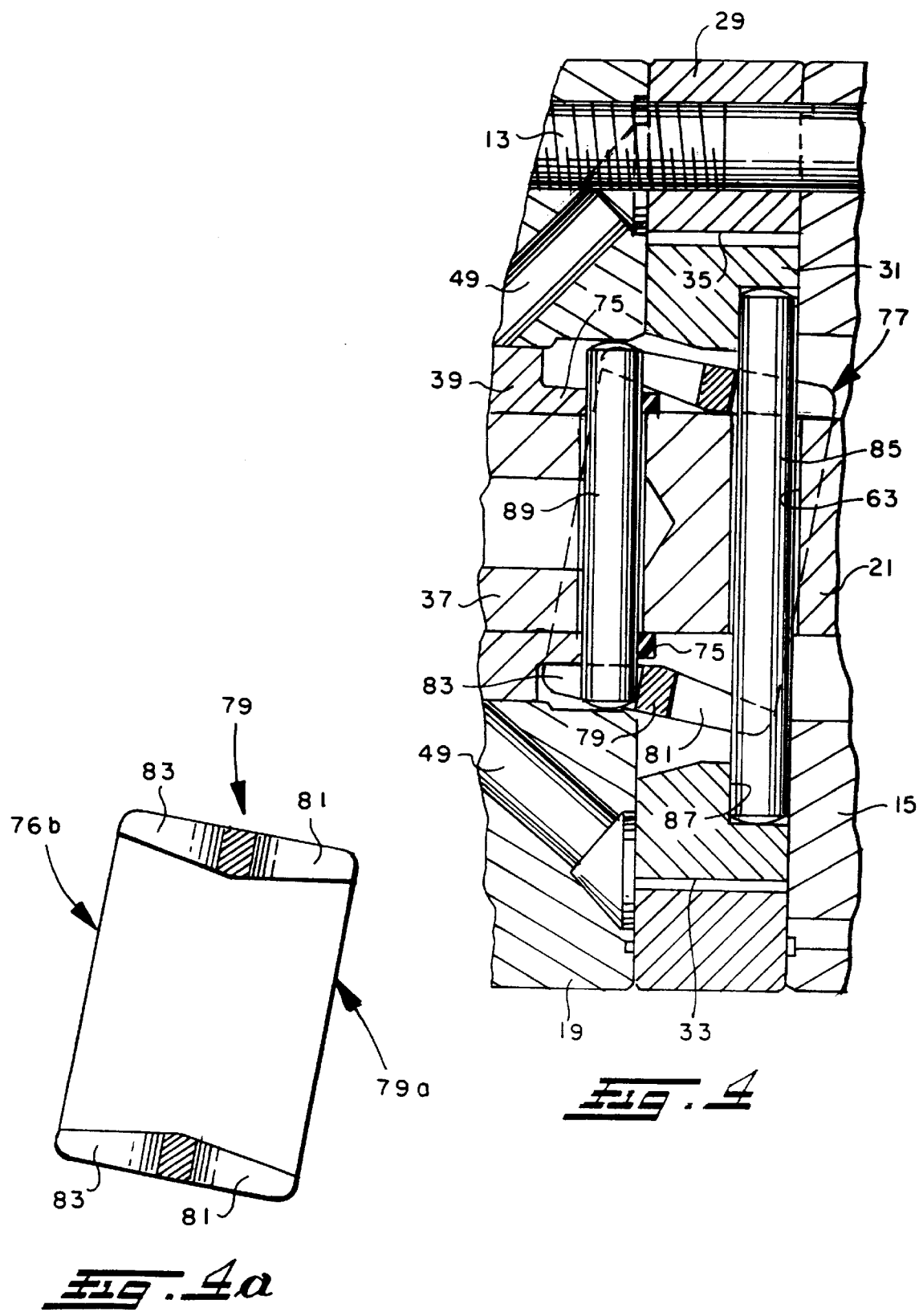

TORQUE GENERATOR STEERING DEVICE

CROSS-REFERENCE TO RELATED APPLICATIONS

This application is a Continuation-In-Part of application U.S. Ser. No. 728,229, filed Oct. 10, 1996 in the name of Sohan L. Uppal for a "STEERING CONTROL UNIT", now U.S. Pat. No. 5,799,694, and is also a Continuation-In-Part of co-pending application U.S. Ser. No. 862,887, filed May 23, 1997, in the name of Sohan L. Uppal, for an "IMPROVED COUPLING FOR USE IN A GEROTOR DEVICE".

STATEMENT REGARDING FEDERALLY SPONSORED RESEARCH OR DEVELOPMENT

Not Applicable

MICROFICHE APPENDIX

Not Applicable

BACKGROUND OF THE DISCLOSURE

The present invention relates to torque generator steering devices, and more particularly, to such devices in which a relatively low torque steering input is translated into a relatively high torque steering output, with the assistance of a source of pressurized fluid.

Torque generators of the type to which the present invention relates have been in commercial use for many years, have been commercially quite successful, and are illustrated and described in greater detail in U.S. Pat. Nos. Re. 25,291 and 4,936,094, both of which are assigned to the assignee of the present invention and are incorporated herein by reference.

In the typical prior art torque generator of the type illustrated and described in the above-incorporated patents, there are three sections: (1) an input section including an input shaft; (2) a fluid displacement mechanism (typically a gerotor gear set); and (3) a valving section, including an output shaft. In the commercially available torque generators, these three sections have always been arranged "serially", i.e., one section after another, axially, starting with the input section and ending with the output section. As a result, the commercial torque generators have been fairly large (i.e., long in the axial direction).

Although the prior art torque generator has been commercially successful, and its design has remained basically unchanged for many years, its market penetration has been somewhat hindered by the overall size of the device. For example, there are many small tractors in use on which torque generator steering devices could be applied on an "after-market" basis, but the overall length of the prior art torque generator prevents it from physically fitting within the available length of the steering column on a number of tractors.

The torque generator currently commercially available from the assignee of the present invention includes two sets of internal splines, and two dogbone shafts which together include three sets of crowned, external splines. The result can be an undesirable amount of looseness or backlash in the mechanical connection between the input shaft and the output shaft, thus hindering the use of the prior art torque generator in certain vehicle applications.

BRIEF SUMMARY OF THE INVENTION

Accordingly, it is an object of the present invention to provide an improved torque generator steering device which is inherently smaller and more compact than in the prior art, thus providing greater value to the vehicle manufacturer.

It is a more specific object of the present invention to provide an improved torque generator steering device which does not consist of different sections arranged axially, but instead, overlaps or "nests" the various sections to reduce substantially the overall length of the device.

It is a related object of the present invention to provide an improved torque generator steering device having fewer spline connections, thus substantially reducing the backlash of the device.

The above and other objects of the invention are accomplished by the provision of an improved torque generator steering device adapted to receive a relatively low torque steering input and generate a relatively high torque steering output by means of a source of pressurized fluid. The steering device comprises housing means defining a fluid inlet port in communication with the source, and a fluid outlet port. A fluid energy-translating displacement means is associated with the housing means and includes a rotor member having relatively high torque rotary motion in response to the flow of the pressurized fluid through the displacement means. A valve means is disposed in the housing means and has a neutral position and an operating position in which the valve means and the housing means cooperate to define a fluid path communicating pressurized fluid from the inlet port to the displacement means, and from the displacement means to the outlet port. The valve means comprises a rotatable, primary valve member and a relatively rotatable follow-up valve member. An input shaft is operable to transmit the relatively low torque steering input into movement of the valve means from the neutral position to the operating position. A follow-up means is operable to transmit the rotary motion of the rotor member into follow-up movement of the valve means from the operating position toward the neutral position. An output shaft is operable to transmit the relatively high torque rotary motion of the rotor member into the relatively high torque steering output.

The improved steering device is characterized by the housing means comprising, at its upstream end, an endcap member having the input shaft extending therethrough. The displacement means comprises a gerotor gear set disposed adjacent the endcap member and including an internally toothed ring member fixed relative to the housing means, the rotor member comprising an externally toothed star member having orbital and rotational movement relative to the ring member. The input shaft extends axially through the star member and is fixed to rotate with the primary valve member. The primary and follow-up valve members are disposed on the output shaft end of the gerotor gear set. The follow-up means comprises the follow-up valve member including a terminal portion disposed immediately adjacent the star member and the terminal portion and the star member including coupling means operable, in response to the rotational movement of the star member, to transmit the orbital and rotational movements into a rotational follow-up movement to the follow-up valve member.

BRIEF DESCRIPTION OF THE DRAWINGS

FIG. 2 is a fragmentary, flat, plan view illustrating the primary valve member of the steering device of FIG. 1.

FIG. 3 is a fragmentary, flat, plan view, similar to FIG. 2 illustrating the follow-up valve member of the steering device of FIG. 1.

FIG. 4 is an enlarged, fragmentary view, similar to FIG. 1, illustrating the coupling arrangement of the present invention, for providing follow-up movement to the follow-up valve member.

FIG. 4a is an axial cross section, similar to FIG. 4, but illustrating only the coupling member which comprises one important aspect of the present invention.

DETAILED DESCRIPTION OF THE PREFERRED EMBODIMENT

Figure 1:
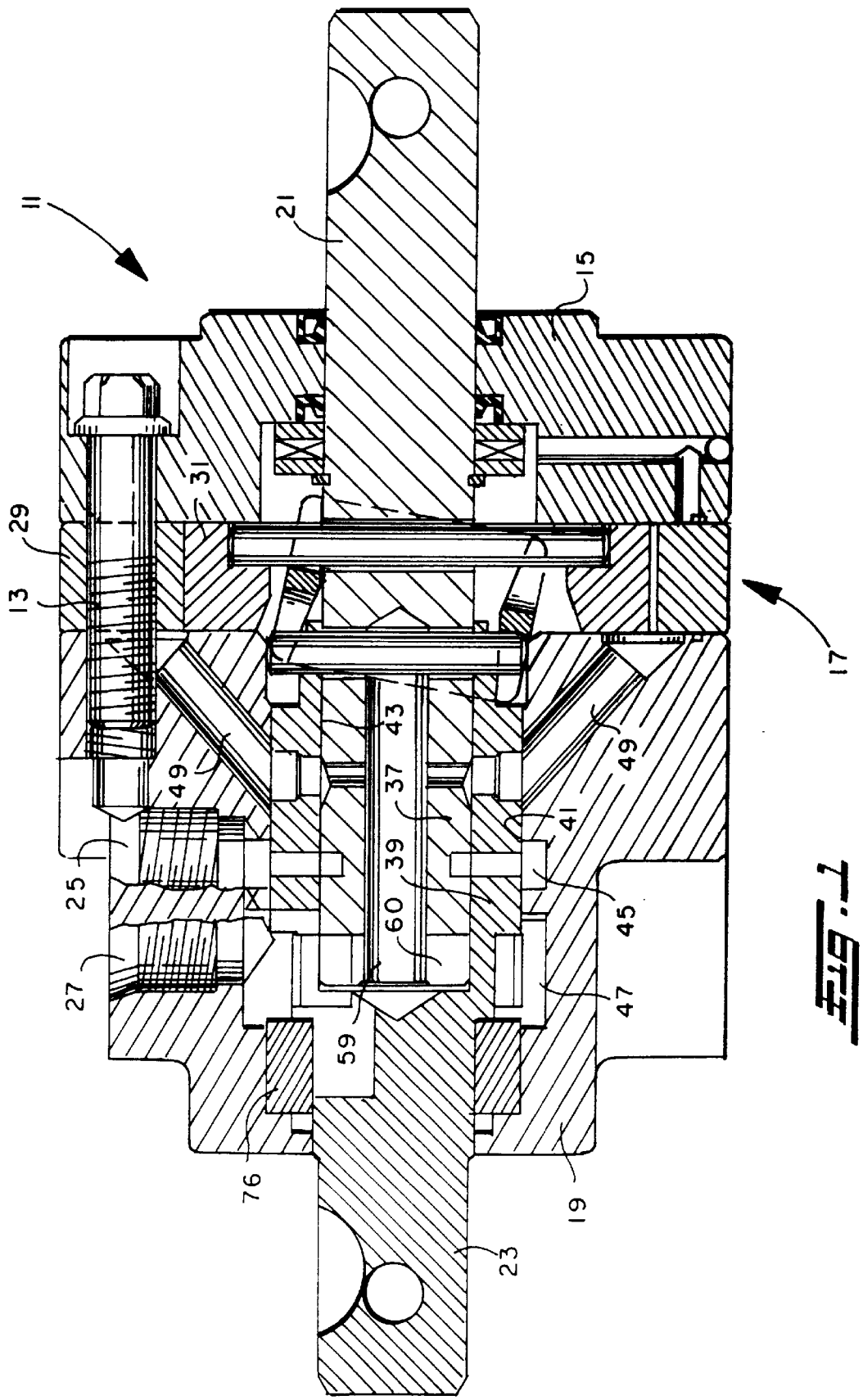
FIG. 1 is an axial cross-section of a torque generator steering device made in accordance with the present invention.

Referring now to the drawings, which are not intended to limit the invention, FIG. 1 illustrates a torque generator steering device, generally designated 11, which is made in accordance with the teachings of the present invention. The steering device 11 includes several sections, held in tight sealing engagement by a plurality of bolts 13 (only one of which is shown in FIG. 1. Thus, the steering device 11 includes an endcap member 15, a gerotor displacement mechanism 17, and a valve housing section 19. Extending through a central opening in the end cap member 15 is an input shaft 21, and similarly, extending through a central opening in the valve housing section 19 is an output shaft 23.

The valve housing section 19 defines an inlet port 25, which is typically connected to a source of pressurized fluid (not shown herein), and an outlet port 27, which is typically connected to the system reservoir, or to a downstream fluid pressure operated device (neither of which are shown herein).

The gerotor displacement mechanism 17, as is well known to those skilled in the art, includes an internally toothed ring member 29, and an externally toothed star member 31. Typically, the star member 31 has one less tooth than the ring member 29, and is eccentrically disposed therein for relative orbital and rotational movement. In the subject embodiment, the ring member 29 is stationary, having the bolts 13 extending therethrough, such that the star member 31 has both the orbital and rotational movements.

As the orbital and rotational movement of the star member 31 occurs, the toothed interaction between the members 29 and 31 defines a plurality of expanding fluid volume chambers 33 (see FIG. 4), and a plurality of contracting fluid volume chambers 35, in a manner also well known to those skilled in the art.

Disposed within the valve housing section 19 is the appropriate valving to effect the communication of fluid from the inlet port 25 to the expanding volume chambers 33, and from the contracting volume chambers 35 to the outlet port 27.

As is generally well known in the art, the torque generator valving includes a primary, rotatable valve member 37, and a relatively rotatable follow-up valve member 39. It is one important aspect of the present invention that the primary valve member 37 is fixed to rotate with the input shaft 21, and that the follow-up valve 39 is fixed to rotate with the output shaft 23. Furthermore, in the subject embodiment, the primary valve member 37 is formed integrally with the input shaft 21, while the follow-up valve member 39 is formed integrally with the output shaft 23, thus reducing the overall number of parts from that needed in the prior art torque generator.

The valve housing section 19 defines a valve bore 41, which receives the follow-up valve member 39 therein, in a relatively close fit relationship. Similarly, the follow-up valve member 39 defines an internal bore 43 which receives the primary valve member 37 therein in a relatively close fit relationship. The fits among the bores and valve members can be substantially the same as those currently utilized in torque generators, and because such fits are not an essential feature of the invention, they will not be discussed further herein.

The valve housing section 19 defines a fluid passage 45 extending from the inlet port 25 to the valve bore 41, and a fluid passage 47 extending from the bore 41 to the outlet port 27. Either or both of the passages 45 and 47 may comprise annular grooves defined by the housing section 19, and "surrounding" the valve bore 41. In addition, the valve housing section 19 defines a plurality of angled passages 49, each of which communicates from the valve bore 41 to a rearward surface of the housing 19, at a location such that each passage 49 is in fluid communication with one of the volume chambers 33 or 35.

Referring now to FIG. 2, the valving of the torque generator steering device will be described in some detail. The primary valve member 37 is also referred to as a "spool" valve, and the follow-up valve member 39 is also referred to as a "sleeve" valve. The spool valve 37 includes an annular groove 51, disposed toward the left end of the spool 37, and in fluid communication with the groove 51 is a plurality of axially extending slots 53. Disposed between each pair of adjacent slots 53 is a shorter axial slot 55, each of which includes a radial bore 57 providing communication between the slot 55 and a central, axial drain bore 59 (see FIG. 1).

Disposed to the right in FIG. 2 of the slots 53 and 55, the spool 37 defines a pair of diametrically opposite, circumferentially-elongated openings 61. To the right of the openings 61 is another pair of diametrically opposite, circumferentially-elongated openings 63, and as may best be seen in FIG. 2, the openings 63 are elongated further in the circumferential direction than are the openings 61 for reasons which will become apparent subsequentially.

Referring now primarily to FIG. 3, the sleeve 39 defines a reduced diameter portion 65 at the junction of the sleeve valve 39 and the output shaft 23, and that reduced diameter portion 65 defines several openings 67 which facilitate communication of case drain fluid from the drain bore 59 out to the outlet port 27.

To the right of the openings 67 the sleeve 39 defines a plurality of pressure ports 69 which are in continuous fluid communication with the passage (annular groove) 45, such that the ports 69 contain pressurized fluid from the inlet port 25. To the right of the ports 69, the sleeve 39 defines a plurality of meter ports 71 which are in commutating fluid communication with the angled passages 49, in a manner well known to those skilled in the steering art. Disposed to the right of the meter ports 71, the sleeve 39 defines a pair of diametrically opposite openings 73, disposed in a reduced diameter portion 75 located at the right end of the sleeve (see FIG. 1). The function of the openings 73 and the portion 75 will be described subsequently.

As illustrated in FIGS. 2 and 3, the torque generator steering device of the present invention includes valving which may be characterized as "open-center". With no manual steering input being exerted on the input shaft 21, a centering spring 76 biases the spool valve 37 and the sleeve valve 39 toward the neutral position, relative to each other. When the spool 37 and sleeve 39 are in neutral, each of the meter ports 71 overlaps both a slot 53 and an adjacent slot 55. Therefore, pressurized fluid entering the inlet port 25 flows through the passage 45, then through the pressure ports 69 into the annular groove 51. From there, fluid flows into the slots 53, then radially out through one of the meter ports 71, then radially inward into the adjacent slot 55. Fluid in the slots 55 then flows radially inward through the bores 57, then to the left (in FIG. 1) in the drain bore 59, and then radially out through notches 60 (see FIG. 2) in the spool 37, then through the openings 67 to the outlet port 27.

When an input steering torque is applied to the input shaft 21, the spool 37 is rotated relative to the sleeve 39, in opposition to the biasing force of the centering spring 76, such that each of the meter ports 71 is no longer communicating with both a slot 53 and a slot 55. Instead, each meter port 71 which is instantaneously in communication with an expanding volume chamber 33, through one of the angled passages 49, is in communication with only a slot 53, and thus communicates pressurized fluid from the inlet port 25 to the expanding chambers 33. At the same time, each of the meter ports 71 which is in communication with one of the contracting fluid volume chambers 35, through an angled passage 49, is in instantaneous communication with only an axial slot 55, such that fluid being exhausted from the contracting chambers 35 is communicated to the outlet port 27 in the manner described previously.

Referring now primarily to FIG. 4, in conjunction with FIG. 1, another important aspect of the present invention will be described. As was mentioned in the BACKGROUND OF THE DISCLOSURE, the prior art torque generator has included two dogbone shafts, one to transmit orbital and rotational movement of the star into rotary follow-up motion of the follow-up valve member, and the other to transmit orbital and rotational movement of the star into rotational motion of the output shaft. In accordance with the present invention, the need for those dogbone shafts is eliminated. Instead, the present invention utilizes a coupling arrangement of the type illustrated and described in co-pending application U.S. Ser. No. 862,887, filed May 23, 1997, in the name of Sohan L. Uppal, for an "IMPROVED COUPLING FOR USE WITH A GEROTOR DEVICE", which is incorporated herein by reference.

The coupling arrangement, generally designated 77, includes a hollow, generally cylindrical coupling member 79 which preferably may comprise a fairly simple and inexpensive member, such as a die cast member or a powdered metal part, etc. The coupling member 79 does not have a uniform wall thickness, as may best be seen in FIG. 4a, but instead, the outside diameter of the member 79 is cylindrical, while the inside diameter increases (and the wall thickness decreases) from the middle toward a forward end portion 79a and toward a rearward end portion 79b.

The coupling member 79 defines a pair of forward notches 81, disposed diametrically opposite each other, and a pair of rearward notches 83, also disposed diametrically opposite each other. In the subject embodiment, and by way of example only, the notches 81 and 83 are circumferentially aligned with each other.

The coupling arrangement 77 includes a forward pin 85 which extends through the openings 63 in the spool 37, and through the forward notches 81 in the coupling member 79. The outer, opposite ends of the pin 85 are pressed into recesses 87 formed in the forward, radially inner portion of the star 31. The coupling arrangement 77 also includes a rearward pin 89 which extends through the openings 61 in the spool 37, through the openings 73 in the sleeve 39, and then through the rearward notches 83 in the coupling member 79. The opposite ends of the pin 89 are restrained by the valve bore 41, or alternatively, by a slightly larger counter bore disposed toward the forward end (right end in FIG. 1) of the valve bore 41.

As the star 31 orbits and rotates, the forward end portion 79a orbits and rotates, because of the pin 85 and the notches 81. This orbital and rotational movement is translated, as is well known to those skilled sin the art, into pure rotational movement of the rearward end portion 79b. This rotational movement of the rearward end portion 79b is translated into follow-up rotation of the sleeve 39 by means of the notches 83 and the pin 89. The pins 83 and 85 pass through the circumferentially-elongated openings 61 and 63, respectively, such that there is a certain amount of relative rotation permitted between the spool 37 and the sleeve 39, even as the follow-up motion is being transmitted from the star 31 to the sleeve 39.

Those skilled in the art will understand that the present invention is not limited to the particular coupling arrangement 77 shown herein, but what is essential to the invention is that the sleeve 39 include a terminal portion disposed adjacent the star 31, so that the orbital and rotational movement of the star can be directly translated into follow-up movement of the sleeve, without interfering with the input shaft and spool valve, and the rotation thereof relative to the sleeve.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A torque generator steering device adapted to receive a relatively low-torque steering input and generate a relatively high-torque steering output by means of a source of pressurized fluid; said steering device comprising housing means defining a fluid inlet port in fluid communication with said source, and a fluid outlet port; fluid energy-translating displacement means associated with said housing means, and including a rotor member having relatively high-torque rotary motion in response to the flow of said pressurized fluid through said displacement means; valve means disposed in said housing means and having a neutral position and an operating position in which said valve means and said housing means cooperate to define a fluid path communicating said pressurized fluid from said inlet port to said displacement means, and from said displacement means to said outlet port, said valve means comprising a rotatable primary valve member and a relatively rotatable follow-up valve member; an input shaft operable to transmit said relatively low-torque steering input into movement of said valve means from said neutral position to said operating position; follow-up means operable to transmit said rotary motion of said rotor member into follow-up movement of said valve means from said operating position toward said neutral position; an output shaft operable to transmit said relatively high-torque rotary motion of said rotor member into said relatively high-torque steering output, characterized by:

(a) said housing means comprises, at its upstream end, an endcap member having said input shaft extending therethrough;

(b) said displacement means comprises a gerotor gear set disposed adjacent said endcap member, and including an internally toothed ring member fixed relative to said housing means and said rotor member comprising an externally toothed star member having orbital and rotational movement relative to said ring member;

(c) said input shaft extending axially through said star member and being fixed to rotate with said primary valve member;

(d) said primary and follow-up valve members being disposed on the output shaft end of said gerotor gear set; and (e) said follow-up means comprises said follow-up valve member including a terminal portion disposed immediately adjacent said star member, and said terminal portion and said star member including coupling means operable, in response to said rotational movement of said star member, to transmit said orbital and rotational movements into a rotational follow-up movement to said follow-up valve member.

2. A torque generator steering device as claimed in claim 1, characterized by said primary valve member comprising a generally cylindrical spool valve member, and said follow-up valve member comprising a hollow, generally cylindrical sleeve valve member surrounding said spool valve member.

3. A torque generator steering device as claimed in claim 2, characterized by said spool valve member being formed integrally with said input shaft.

4. A torque generator steering device as claimed in claim 2, characterized by said sleeve valve member being formed integrally with said output shaft.

5. A torque generator steering device as claimed in claim 1, characterized by said coupling means comprises a generally cylindrical, hollow coupling member surrounding said input shaft and operably associated with said terminal portion of said follow-up valve member.

6. A torque generator steering device as claimed in claim 5, characterized by said coupling member comprising a forward end portion and a rearward end portion, said forward end portion being coupled to said star member for orbital and rotational movement therewith, and said rearward end portion being coupled to said follow-up valve member for rotation therewith.

7. A torque generator steering device as claimed in claim 6, characterized by said terminal portion comprising said follow-up valve member comprising a hollow, generally cylindrical sleeve valve member including a forward, reduced diameter portion, and said rearward end portion of said coupling member being disposed in surrounding relationship to said reduced diameter portion of said sleeve valve member.

* * * * *